Aug. 12, 1958    H. L. SCHALL    2,846,897
CONNECTING ROD

Filed July 20, 1955    2 Sheets-Sheet 1

INVENTOR.
Harold L. Schall
BY
Wilson, Redrow & Sadler

Aug. 12, 1958    H. L. SCHALL    2,846,897
CONNECTING ROD

Filed July 20, 1955    2 Sheets-Sheet 2

INVENTOR.
Harold L. Schall
BY
Wilson, Redrow & Sadler

United States Patent Office

2,846,897
Patented Aug. 12, 1958

2,846,897

CONNECTING ROD

Harold L. Schall, South Bend, Ind., assignor to Studebaker-Packard Corporation, Detroit, Mich., a corporation of Michigan Application July 20, 1955, Serial No. 523,237

3 Claims. (Cl. 74—579)

This invention relates to connecting rods for internal combustion engines.

In present day high-speed internal combustion engines, the connecting rod crankshaft bearings are subjected to severe operating conditions. When an engine is operated at high speed, tremendous forces are required to overcome the inertia and reverse the direction of travel of a connecting rod and the piston attached thereto at the moments at which the piston is approximately at its top and bottom dead center positions. These tremendous forces are transmitted and applied between the connecting rod crankshaft bearing and the portion of the crankshaft or crankpin journaled therein. Theoretically there is only line contact between the crankpin and the connecting rod bearing but the forces transmitted through these members causes a flattening of the contacting surfaces so that actually there is area contact between the crankpin and the bearing. The area of contact is very small, however, so that the forces are concentrated within a very small area and the pressure, in pounds per square inch, to which the area of contact of the bearing is subjected is enormous.

It is known that during each cycle of an engine the greatest force transmitted through a connecting rod occurs when the piston is at its dead center position at the end of the exhaust stroke. At this point in the cycle the piston has its greatest inertia and it is at this point that the greatest force acting between the connecting rod and the crankpin is developed. This force is developed when the crankpin cooperates with the lower half of the connecting rod bearing to arrest the motion of the piston as it reaches its top dead center position at the end of the exhaust stroke.

The present inventor has observed, however, that during operation of an engine having prior art connecting rods it is invariably the upper half of the connecting rod bearing which receives the most wear or damage. This is an apparent anomoly because even though forces of greater magnitude are transmitted through the lower half of the bearing than are transmitted through the upper half of the bearing, it is the upper half of the bearing which is subjected to the greatest wear and damage.

In analysing the anomoly the present inventor discovered that the cap of the connecting rod has an inherent flexibility which causes the cap to bend or become distorted to the extent that it and the lower half of the bearing disposed therein tend to wrap around the crankpin during the time a force is being transmitted between the crankpin and the connecting rod cap. The construction or shape of the cap, which is generally arc shaped or half cylindrical in shape, is the reason why the cap functions in this manner. Although the bending of the cap due to the forces referred to above is relatively small, being on the order of a thousandth of an inch or less out of its true cylindrical configuration, such bending is effective to appreciably increase the area of contact between the lower half of the bearing and the crankpin. The result is that the unit bearing stress on the lower half of the bearing is considerably less than it would be if the rigidity of the cap were such that the forces between the cap and the crankpin were resisted to the extent that substantially no bending of the cap would occur.

The generally half cylindrically shaped portion of the connecting rod in which the upper half of the crankpin bearing is disposed is quite rigid in prior art constructions, however. The reason is because this portion of the connecting rod is rigidly supported by the shank of the connecting rod to which it is attached. As a result, the forces transmitted through this portion of the connecting rod and the upper half of the crankpin bearing disposed therein do not cause any appreciable bending of this portion of the connecting rod or the upper half of the crankpin bearing disposed therein. The area of contact between the upper half of the bearing and the crankpin is therefore no greater than the area of contact which normally results when a convex surface forcibly engages a concave surface having a slightly larger radius. In other words, there is very little tendency for the upper half of the connecting rod crankpin bearing to wrap itself around the crankpin because of the rigid support of the shank of the connecting rod. The portion of the connecting rod in which the upper half of the bearing is disposed is therefore not sufficiently flexible to bend appreciably when subjected to forces transmitted through the connecting rod to force the upper half of the bearing to wrap itself around the crankpin and increase the area of contact therebetween.

Thus, in prior art connecting rod constructions, the area of contact between the upper half of the connecting rod crankpin bearing and the crankpin is less than the area of contact between the lower half of the bearing and the crankpin during those times when forces are being transmitted through the respective halves of the bearing. Therefore, even though forces of greater magnitude are transmitted through the lower half of the bearing during each cycle of operation, the larger area of contact between the lower half of the bearing and the crankpin causes the lower half of the bearing to be subjected to less unit stress in pounds per square inch than the upper half of the bearing is subjected to. This then is the reason why in prior art connecting rod constructions the upper half of the crankpin bearing disposed therein is subjected to much more wear and damage, especially by pounding out, than the lower half of the bearing.

The present invention is directed to the providing of a connecting rod construction in which the shank thereof is attached to the end portion of the connecting rod in which the upper half of the crankpin bearing is disposed in a manner so that such end portion of the connecting rod will have a greater degree of flexibility. With a greater degree of flexibility this end portion of the connecting rod will be caused to bend a correspondingly greater amount when forces are transmitted between such end portion and the crankpin to cause the upper half of the bearing to tend to wrap itself around the crankpin and thereby increase the area of contact therebetween. And this is a main object of the invention.

Another object of the invention is to provide a new and improved connecting rod construction in which the upper and lower halves of the crankpin bearing disposed therein are subjected to nearly equal wear during operation of the engine in which the connecting rod is disposed.

Other objects of the invention will become apparent from the following specification, the drawings relating thereto, and the appended claims.

The principles of the invention are applicable to connecting rods generally. For purposes of illustration, and not by way of limitation, the invention is disclosed herein in connection with connecting rods of the type utilized in internal combustion engines.

Figures 1, 2:
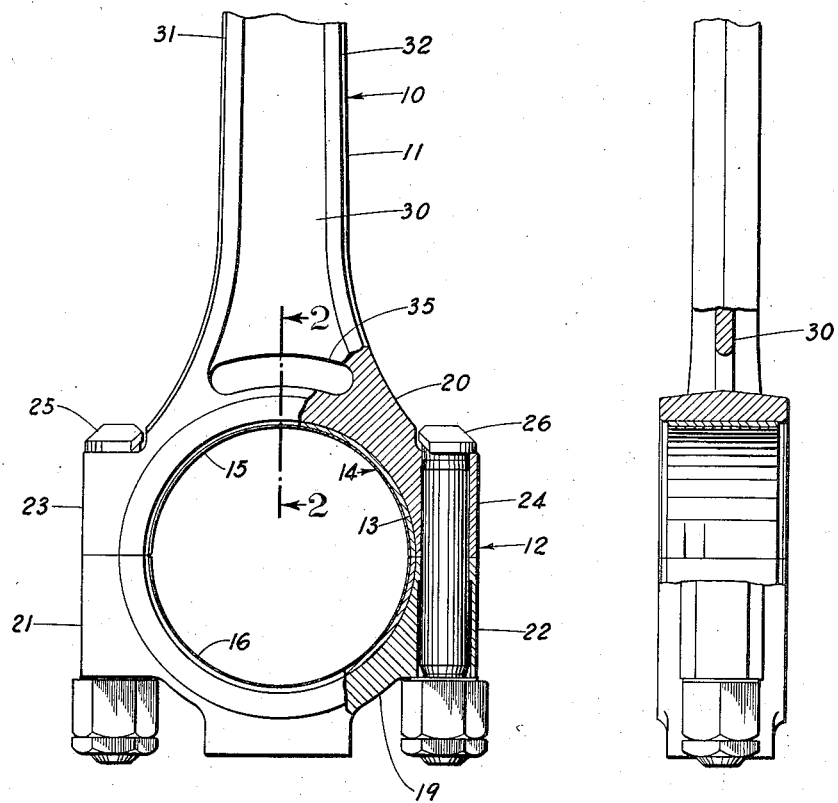
Fig. 1 is a fragmentary front view, partially in section, of a connecting rod embodying my invention.
Fig. 2 is a fragmentary side view, with a partial section taken on line II—II of Fig. 1, of the connecting rod shown in Fig. 1.

The connecting rod 10 shown in Figs. 1 and 2 comprises a shank portion 11 and a crankpin receiving end portion 12 having a cylindrical bore 13. Disposed within bore 13 is a shell type crankpin bearing 14 which may comprise upper and lower semi-cylindrical halves 15 and 16 as illustrated or be made in one piece. The two bearing halves 15 and 16 are arranged with their edges in abutting relation and cooperate to form a completely cylindrical bearing 14.

End portion 12 of the connecting rod is split axially through bore 13 to provide a cap 19 in which the lower half 16 of bearing 14 is disposed and a generally half cylindrically shaped portion 20 in which the upper half 15 of bearing 14 is disposed.

Cap 19 is provided with bosses 21 and 22 on each side thereof which abuttingly engage bosses 23 and 24 on the half cylindrically shaped portion 20. Bores are provided in the bosses for the reception of bolts 25 and 26 to facilitate assembling of the connecting rod.

In the embodiment of the invention illustrated in Figs. 1 and 2, shank portion 10 of the connecting rod is integrally connected to the half cylindrically shaped portion 20. Shank portion 10 is illustrated as having a central web 30 and spaced flanges 31 and 32 extending longitudinally of shank portion 10.

Disposed between shank portion 10 and the half cylindrically shaped portion 20 is an aperture 35 which is illustrated as being an arc shaped slot which is positioned coaxially relative to the crankpin bore 13. Aperture 35 functions to relieve portion 20 of the stiffening or backing support of shank portion 10 and accordingly makes portion 20 more flexible. This construction, in which provision is made for appreciably increasing the flexibility of portion 20 of the connecting rod, is effective to cause portion 20 to force the upper half 15 of bearing 14 to tend to wrap itself around a crankpin disposed in bore 13 when forces are being transmitted between portion 20 and the crankpin. This tendency of the bearing half 15 to wrap around the crankpin appreciably increases the area of contact between these members. The beneficial result is that the unit bearing stress on the upper bearing half 15 is considerably smaller than it would be if the increased flexibility were not provided for portion 20 in accordance with the present invention.

Figures 3, 4:
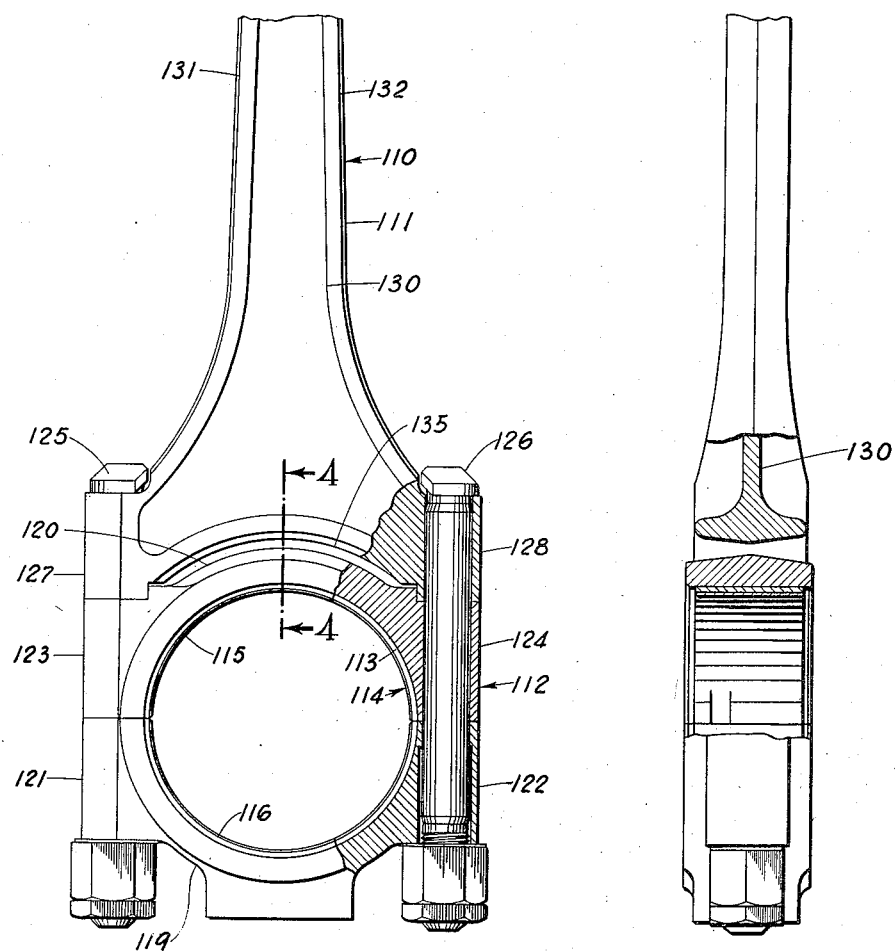
Fig. 3 is a fragmentary front view, partially in section, of a modified connecting rod embodying my invention.
Fig. 4 is a fragmentary side view, with a partial section taken on line IV—IV of Fig. 3.

A modified embodiment of the invention is illustrated in Figs. 3 and 4.

The connecting rod 110 shown in Figs. 3 and 4 comprises a shank portion 111 and a crankpin receiving end portion 112 having a cylindrical bore 113. Disposed within bore 113 is a shell type crankpin bearing 114 which may comprise upper and lower semi-cylidnrical halves 115 and 116 as illustrated or be made in one piece. The two bearing halves 115 and 116 are arranged with their edges in abutting relation and cooperate to form a completely cylindrical bearing 114.

End portion 112 of the connecting rod is split axially through bore 113 to provide a cap 119 in which the lower half 116 of bearing 114 is disposed and a generally half cylindrically shaped portion 120 in which the upper half 115 of bearing 114 is disposed.

In the embodiment of the invention illustrated in Figs. 1 and 2, shank portion 10 of the connecting rod is integrally connected to the half cylindrically shaped portion 20. In the embodiment of Figs. 3 and 4, however, shank portion 110 is a separate member and is bolted to the half cylindrically shaped portion 120 which may be similar in shape, or even identical, to cap 119.

Cap 119 is provided with bosses 121 and 122 on each side thereof which abuttingly engage bosses 123 and 124 on the half cylindrically shaped portion 120. Bosses 127 and 128 are provided on each side of shank portion 110 which also abuttingly engage bosses 123 and 124 on the portion 120 but on the other side thereof from bosses 121 and 122. Bores are provided in the bosses for the reception of bolts 125 and 126 to facilitate assembling of the connecting rod.

Shank portion 110 is illustrated as having a central web 130 and spaced flanges 131 and 132 extending longitudinally of shank portion 110.

Shank portion 110 and the half cylindrically shaped portion 120 are formed so as to define therebetween an aperture 135 which is illustrated as being arc shaped slot and which is positioned coaxially relative to the crankpin bore 113. Aperture 135 functions to relieve portion 120 of the stiffening or backing support of shank portion 110 and accordingly makes portion 120 more flexible in somewhat the same manner as in the embodiment of the invention illustrated in Figs. 1 and 2.

An advantage of the construction shown in Figs. 3 and 4 is that portion 120 is as free to flex as is cap 119. Also that the maximum amount of relief from the stiffening or backing support from shank portion 110 is obtained with this construction.

The invention may be embodied in other specific forms without departing from the spirit or essential characteristics thereof. The present two embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

It is claimed and desired to secure by Letters Patent:

1. A one piece connecting rod member comprising a shank portion, an arch portion integrally connected to said shank portion having an arcuate bearing engaging surface, said rod member being formed to define an arcuate slot between said shank portion and said arch portion in generally coaxial relation to said arcuate bearing engaging surface.

2. A one piece connecting rod member comprising a webbed shank portion having spaced longitudinally extending flanges, an arch portion integrally connected to said shank portion having an arcuate bearing engaging surface, said rod member being formed to define an arcuate slot between said shank portion and said arch portion having an arcuate surface adjacent said arch portion in generally coaxial relation to said arcuate bearing engaging surface.

3. A one piece connecting rod member comprising a shank portion, an arch portion integrally connected to said shank portion at spaced points on opposite sides of the centerline of said shank portion and having an arcuate bearing engaging surface, said rod member being formed to define an arcuate slot between said shank portion and said arch portion having an arcuate surface adjacent said arch portion in coaxial relation to said arcuate bearing engaging surface.

References Cited in the file of this patent

UNITED STATES PATENTS

| 800,592 | Phillips | Sept. 26, 1905 |
| 993,685 | Holmes | May 30, 1911 |
| 1,605,742 | Jordan et al. | Nov. 2, 1926 |
| 1,612,047 | Owens | Dec. 28, 1926 |
| 1,782,655 | Jameson | Nov. 25, 1930 |

FOREIGN PATENTS

| 464,724 | Great Britain | Apr. 23, 1937 |